United States Patent
Chau et al.

[11] Patent Number: 5,858,809
[45] Date of Patent: Jan. 12, 1999

[54] CONDUCTIVE PLANE BENEATH SUSPENDED MICROSTRUCTURE

[75] Inventors: Kevin Hin-Leung Chau, North Andover, Mass.; Roger T. Howe, Lafayette, Calif.; Richard S. Payne, Andover, Mass.; Yang Zhao; Theresa A. Core, both of North Andover, Mass.; Steven J. Sherman, Lexington, Mass.

[73] Assignee: Analog Devices, Norwood, Mass.

[21] Appl. No.: 820,316

[22] Filed: Mar. 18, 1997

Related U.S. Application Data

[62] Division of Ser. No. 347,702, Dec. 1, 1994, Pat. No. 5,640,039.

[51] Int. Cl.$^6$ .................................................. H01L 21/465
[52] U.S. Cl. ................................................. 438/52; 438/53
[58] Field of Search .............................. 438/52, 53, 412, 438/438

[56] References Cited

U.S. PATENT DOCUMENTS

| | | | |
|---|---|---|---|
| 5,151,763 | 9/1992 | Marek et al. | 357/26 |
| 5,326,726 | 7/1994 | Tsang et al. | 437/228 |
| 5,345,824 | 9/1994 | Sherman et al. | 73/517 B |
| 5,347,867 | 9/1994 | Pangerl | 73/517 R |
| 5,504,356 | 4/1996 | Takeuchi et al. | 257/254 |
| 5,543,013 | 8/1996 | Tsang et al. | 156/643.1 |
| 5,576,250 | 11/1996 | Diem et al. | 437/228 |

FOREIGN PATENT DOCUMENTS 63-198378 8/1988 Japan ..................................... 438/412

OTHER PUBLICATIONS

Gianchandani et al., "A Bulk Silicon Dissolved Wafer Process for Micro–electromechanical Devices," J. Microelect. Syst., vol. 1/No. 2, Jun. 1992, pp. 77–85.

Hirano et al., "Design, Fabrication, and Operation of Submicron Gap Comb–Drive Microactuators," J. Microelect. Syst., vol. 1/No. 1, Mar. 1922, pp. 52–59.

Petersen et al, "Micromechanical Accelerometer Integrated w/MOS Detection Circuitry," IEEE Trans. Electron Devices, vol. ed–29/No. 1, Jan. 1982, pp. 23–27.

*Primary Examiner*—Charles Bowers
*Assistant Examiner*—Matthew Whipple
*Attorney, Agent, or Firm*—Hale and Dorr LLP

[57] ABSTRACT

A method and apparatus for providing a conductive plane beneath a suspended microstructure. A conductive region is diffused into a substrate. A dielectric layer is added, covering the substrate, and then removed from a portion of the conductive region. A spacer layer is deposited over the dielectric and exposed conductive region. A polysilicon layer is deposited over the spacer layer, and formed into the shape of the suspended microstructure. After removal of the spacer layer, the suspended microstructure is left free to move above an exposed conductive plane. The conductive plane is driven to the same potential as the microstructure.

10 Claims, 3 Drawing Sheets

CONDUCTIVE PLANE BENEATH SUSPENDED MICROSTRUCTURE

This application is a division of application Ser. No. 08/347,702, filed Dec. 1, 1994, now U.S. Pat. No. 5,640,039.

FIELD OF THE INVENTION

This invention relates to the field of micromachined electro-mechanical structures and, more particularly, to structures for minimizing unwanted electrostatic forces and charges in micromachined electro-mechanical structures.

BACKGROUND OF THE INVENTION

Movable micromachined silicon structures frequently are used as sensors and actuators, and for signal processing. For example, the fingers of a movable mass may be positioned between stationary plates to form a differential capacitor. When a force is applied to the structure in a predetermined direction, the movable mass moves relative to the plates, changing the capacitances and inducing an amplitude modulated signal onto the mass. The induced signal, which is proportional to the magnitude of the acceleration, may be output for further processing. An example of such a device is described in U.S. Pat. No. 5,345,824, entitled "Monolithic Accelerometer", which is incorporated herein by reference.

In designing a micromachined electro-mechanical structure, it is important to minimize or stabilize parasitic electrostatic forces on the structure. For example, placing a conductive plane under the structure that is kept at nearly the same electrical potential as the structure minimizes the electrostatic attractive force that would tend to pull the structure down to the substrate. However, in the conventional fabrication process for this sensor, in order to conduct further processing, the conductive plane is coated with a thin, insulating dielectric layer. The presence of this thin dielectric layer results in an electrically isolated surface underneath the micromachined structure. Electric changes can accumulate on the surface of the dielectric layer and cause electrostatic forces, indistinguishable from an inertial force such as one produced by acceleration, on the structure. This results in a shift in the sensor output. Also, the potential of this isolated surface changes due to charge accumulations, which causes a spurious output signal.

The present invention overcomes these problems as will be shown in the remainder of the specification referring to the attached drawings.

SUMMARY OF THE INVENTION

The present invention is a micromachined electro-mechanical structure, and a method for making such a structure, in which a movable mass is positioned above an exposed conductive plane, with the conductive plane held at a controlled potential. In a preferred embodiment, the potential of the conductive plane is tied to the potential of the movable mass.

In a preferred embodiment, a silicon conductive plane is formed from an n+ region diffused into a p-silicon substrate. Alternatively, a p+ region could be diffused into an n-silicon substrate. A dielectric, such as silicon nitride, is then deposited over the substrate, and an area above the conductive plane that will be under the movable structure is etched away. Alternatively, a combination of silicon nitride over silicon oxide could be used for the dielectric, with the oxide serving as an etch stop for the removal of the nitride over the conductive plane. A spacer layer, such as silicon oxide, is then deposited over the dielectric and conductive plane, to permit a polysilicon layer to be deposited, to form the microstructure. After the spacer oxide is removed, the polysilicon microstructure is left suspended above the exposed conductive plane.

Preferably, in normal operation, the conductive plane is driven to follow the voltage of the movable mass, thereby eliminating parasitic electrostatic forces between the mass and the conductive plane, and increasing the accuracy and sensitivity of the device.

Alternatively, a conductive polysilicon film deposited over the dielectric layer and patterned in an area that will be under the movable structure can be used. However, an additional deposition step is needed, which increases the complexity and cost of the structure.

An object of the present invention is to provide an improved micromachined structure.

A further object of the present invention is to provide a micromachined structure with reduced parasitic electrostatic forces.

Another object of the present invention is to provide a method for manufacturing a micromachined structure with reduced parasitic electrostatic forces.

These and other objects will be described in detail in the remainder of the specification referring to the drawings.

DETAILED DESCRIPTION OF THE INVENTION

Figure 1:
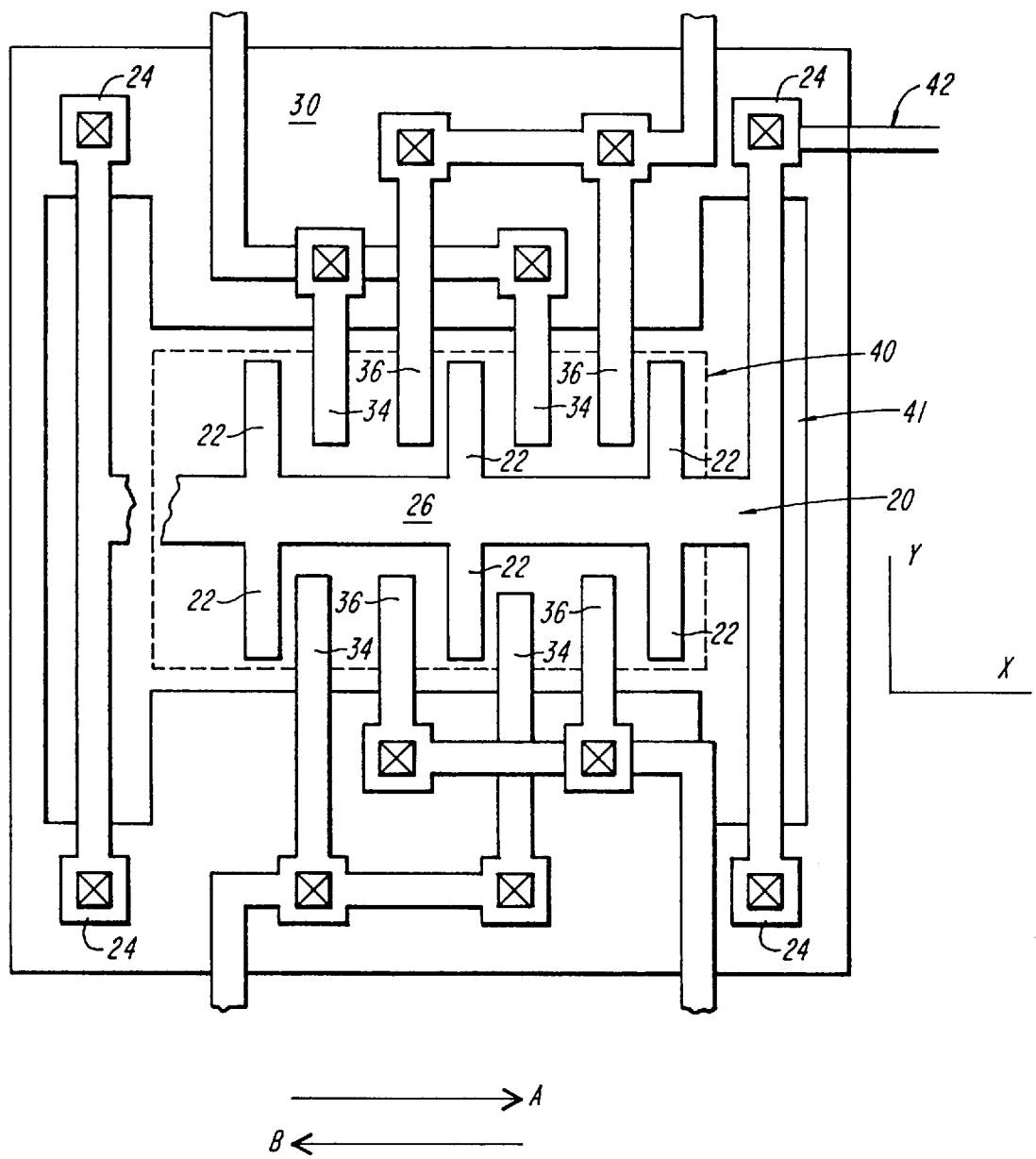
FIG. 1 is a top view of a micromachined electro-mechanical structure with the exposed conductive plane of the present invention.

With reference to FIG. 1, a portion of a micromachined electro-mechanical structure is shown. A polysilicon movable mass 20 includes a central beam 26, from which extend fingers 22. Mass 20 is suspended by anchors 24 above substrate 30, so that it moves in directions "A" and "B" in response to a force along the X-axis.

Fixed fingers 34 and 36 are interleaved between mass fingers 22 to form a differential capacitor. The capacitance of the differential capacitor changes in response to movement of mass 20 and its fingers 22 relative to fixed fingers 34 and 36.

High-frequency signals (preferably, approximately 1 megahertz) of the same amplitude but 180 degrees out of phase are applied to fixed fingers 34 and 36, respectively. The high-frequency signals also may have different d.c. biasing signals applied. Mass 20 will be at a potential midway between the potentials of the biasing signals when no force is applied to the sensor. A force along the X-axis causes mass 20 and its fingers 22 to move relative to fixed fingers 34 and 36. This induces a high-frequency signal in mass 20, with its amplitude modulated in proportion to the magnitude of the force.

Diffused into substrate 30 is exposed n+ region 40, which serves as a conductive plane. Exposed n+ region 40 is part of n+ diffusion area 41. Preferably, exposed n+ region 40 is situated below all of mass fingers 22, which perform the sensing function, and most of the central beam 26 of mass 20. In a preferred embodiment, n+ diffusion area 41 lies under substantially all of mass 20 except in the vicinity of anchors 24. Exposed n+ region 40 may be situated below a portion of fixed fingers 34 and 36.

Figure 2:
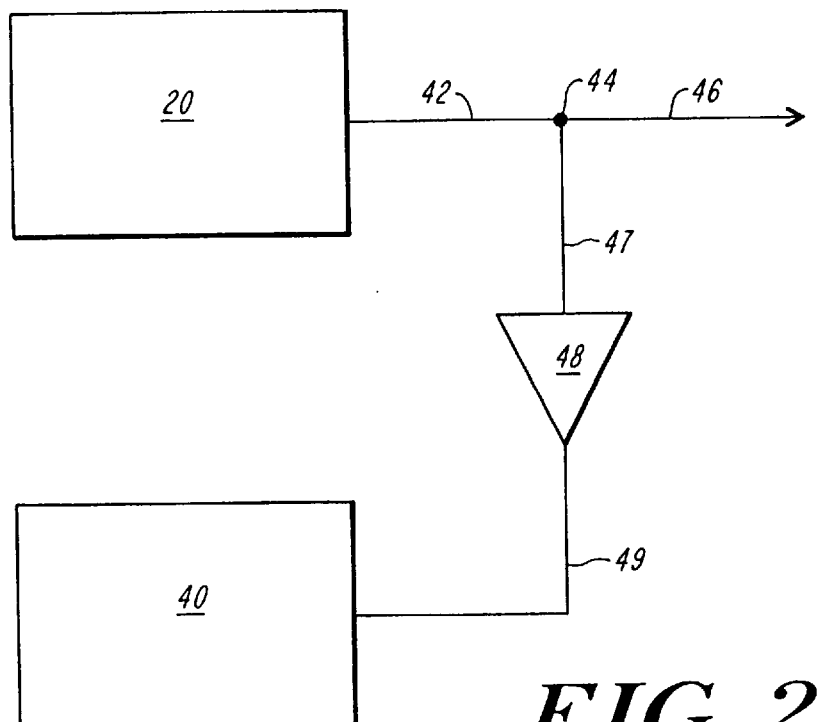
FIG. 2 is a block diagram of a circuit for driving the conductive plane at the potential of the microstructure according to the present invention.

FIG. 2 is a block diagram of the circuit for driving the bare conductive plane at a potential of the microstructure. As is shown, the signals on mass 20 are output through line 42. Line 42 connects to node 44, which also connects via line 46 to circuitry (not shown) for processing the signal on mass 20, and to the input of buffer 48 via line 47. The output of buffer 48 feeds the signal from mass 20 to exposed n+ region 40, and, therefore, the rest of n+ diffusion area 41, via line 49.

Alternatively, additional elements could be added to the feedback circuit. For example, only the d.c. components of the signal on mass 20 could be fed to exposed n+ region 40 (by adding a low-pass filter), or an additional input could be provided to exposed n+ region 40 for testing or biasing purposes through conventional circuits.

Figure 3:
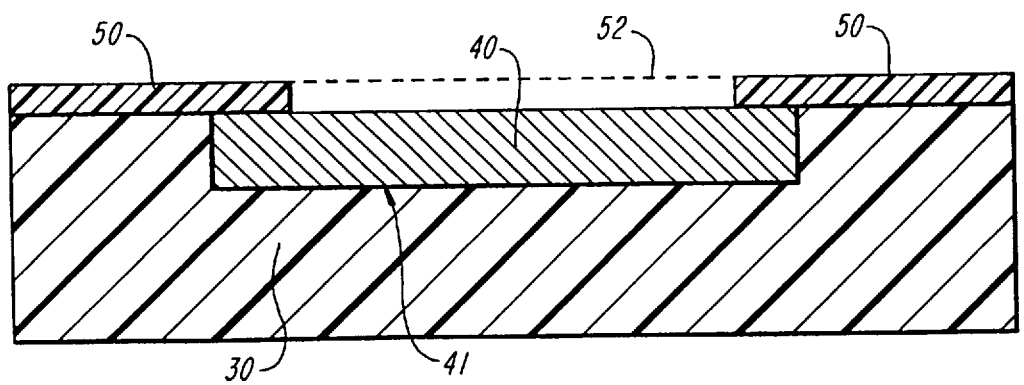
FIG. 3 is a cross-sectional view of the region of the microstructure of the present invention around the conductive plane after a dielectric has been deposited over the substrate and etched to expose the conductive plane.
Figure 4:
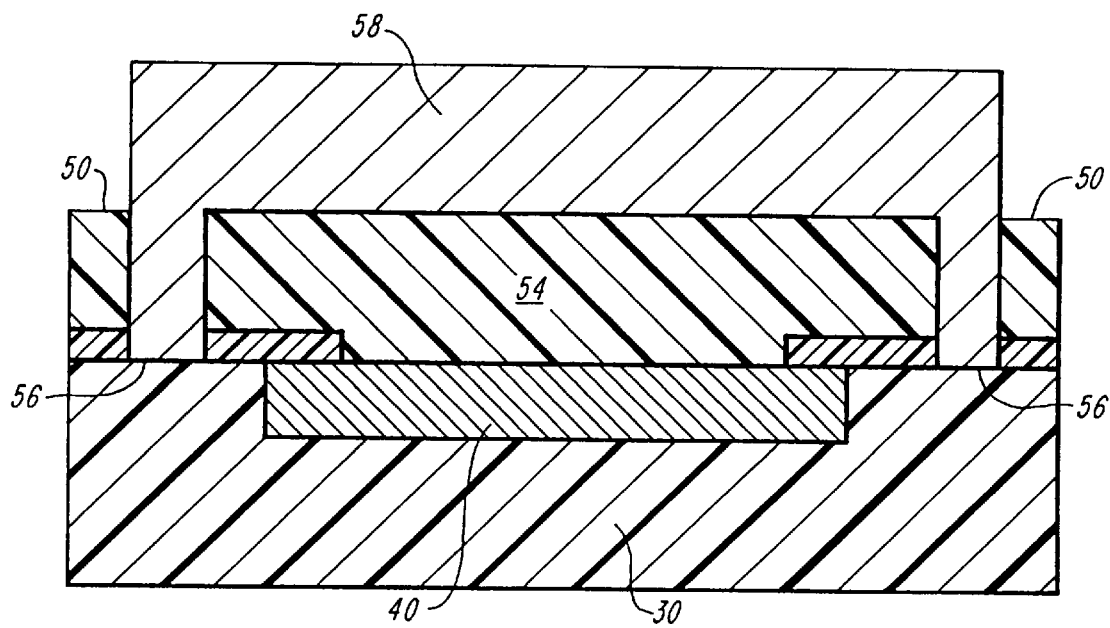
FIG. 4 is a cross-sectional view of the region of the microstructure of the present invention around the conductive plane after the polysilicon layer has been deposited.
Figure 5:
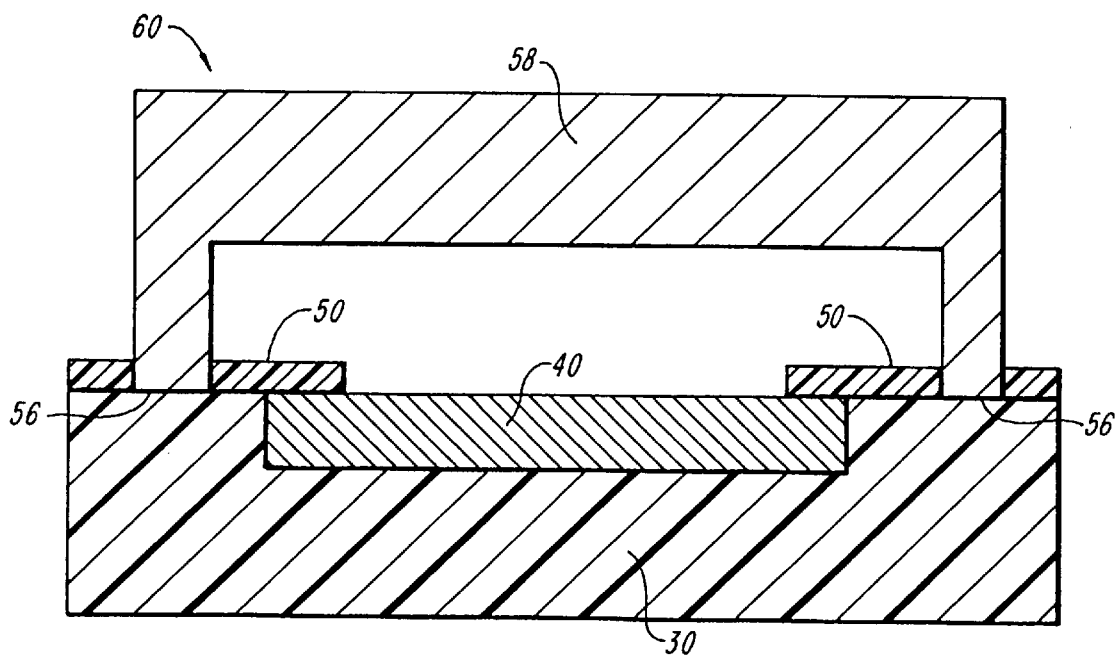
FIG. 5 is a cross-sectional view of the region of the microstructure of the present invention around the conductive plane after removal of the spacer underneath the movable structure.

A process for manufacturing the exposed conductive plane is shown in FIGS. 3–5. Numerous conventional steps in the fabrication process have been omitted as unnecessary to teach those skilled in the art the process of the current invention.

As shown in FIG. 3, n+ diffusion area 41 is diffused into p-silicon substrate 30. A layer of silicon nitride 50 is deposited over the substrate, as a dielectric. Alternatively, other dielectrics could be used. Silicon nitride layer 50 is etched from a region 52 to expose n+ region 40 of diffusion area 41. It is understood that exposed n+ region 40 may have a native oxide layer coating the surface and still be considered to be exposed.

Silicon oxide spacer 54 is deposited over silicon nitride layer 50 and exposed n+ region 40, as shown in FIG. 4. Spacer 54 and silicon nitride layer 50 are removed from selected areas to open anchor regions 56. Polysilicon layer 58 is deposited into anchor regions 56 and atop spacer 54, and patterned to form a movable micromachine structure, such as mass 20 in FIG. 1. Alternatively, a single crystalline silicon layer could be formed over spacer 54 by wafer-to-wafer bonding, with the wafer etched to form the movable microstructure.

Spacer 54 can then be removed, leaving movable microstructure 60 mounted above substrate 30 and n+ region 40, as shown in FIG. 5. Exposed n+ region 40 provides an exposed conductive plane underneath the sensing portions of movable microstructure 60. Any charge that builds up on silicon nitride dielectric layer 50 does not cause any significant electrostatic forces on microstructure 60, because relatively little of microstructure 60 is suspended over dielectric layer 50. Rather, microstructure 60 is suspended over the exposed conductive plane 40, which is controlled at a specific potential.

While there have been shown and described examples of the present invention, it will be readily apparent to those skilled in the art that various changes and modifications may be made therein without departing from the scope of the invention as defined by the appended claims. Accordingly, the invention is limited only by the following claims and equivalents thereto.

We claim:

1. A method for fabricating an electro-mechanical structure having a suspended microstructure comprising the steps of:

providing a substrate;

forming a diffused conductive region;

depositing a dielectric over the substrate;

removing the dielectric to expose a portion of said conductive region;

depositing a spacer layer over the dielectric and the exposed portion of the conductive region;

depositing a conductive layer over the spacer layer from which the suspended microstructure will be formed;

forming the suspended microstructure in the conductive layer substantially over the; and removing the spacer layer so that said suspended microstructure is positioned above said exposed conductive region.

2. The method according to claim 1, further comprising the step of forming a conductive path in the substrate from the conductive layer to the conductive region.

3. The method according to claim 2, wherein the substrate includes a p-silicon substrate.

4. The method according to claim 3, wherein the conductive region includes an n+ diffused region.

5. The method according to claim 2, wherein the substrate includes an n-silicon substrate.

6. The method according to claim 5, wherein the conductive region includes a p+ diffused region.

7. The method according to claim 2, wherein the step of forming a conductive path includes forming a first conductive path from the conductive layer to an input of a buffer and forming a second conductive path from an output of a buffer to the conductive region.

8. The method according to claim 1, wherein the dielectric includes silicon nitride.

9. The method according to claim 1, wherein the spacer includes silicon oxide.

10. The method according to claim 1, wherein the conductive layer includes polysilicon.

* * * * *

UNITED STATES PATENT AND TRADEMARK OFFICE
CERTIFICATE OF CORRECTION

PATENT NO. : 5,858,809
DATED : January 12, 1999
INVENTOR(S) : Kevin Hin-Leung Chau et al.

It is certified that error appears in the above-identified patent and that said Letters Patent is hereby corrected as shown below:

On the title page, in the Assignee name, " analog Devices" should be --Analog Devices, Inc. --

In column 4, line 30, claim 1, delete " substantially over the "

Signed and Sealed this

Eighteenth Day of May, 1999

Attest:

Attesting Officer

Q. TODD DICKINSON

Acting Commissioner of Patents and Trademarks